J. D. Browne,
BEST AVAILABLE COPY
Apple Parer,
No. 2,339, Reissued Aug. 21, 1866.
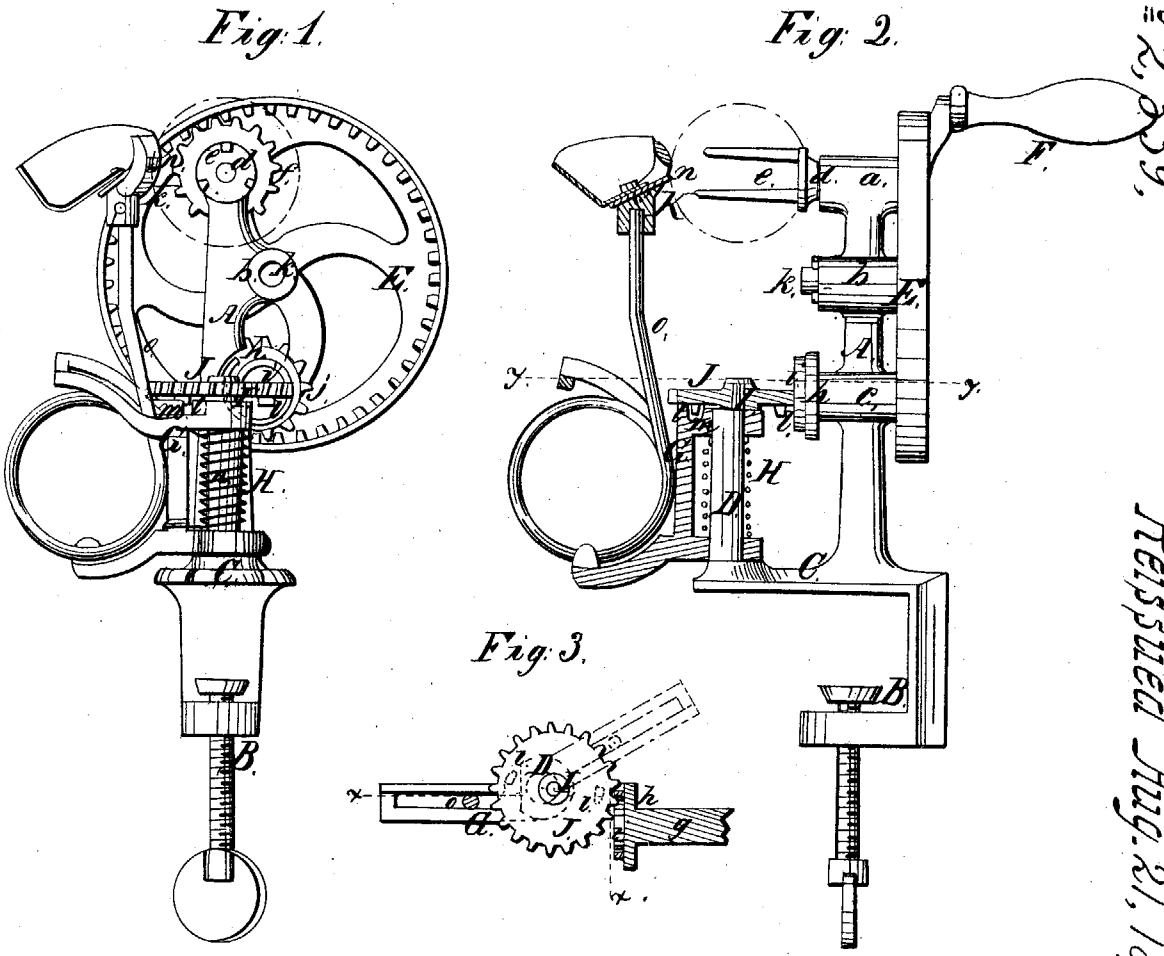
N. PETERS, PHOTO-LITHOGRAPHER, WASHINGTON, D. C.

UNITED STATES PATENT OFFICE.

JAMES F. MONROE, OF FITCHBURG, MASSACHUSETTS, ASSIGNEE, BY MESNE ASSIGNMENTS, OF JOHN D. BROWNE.

IMPROVED MACHINE FOR PARING APPLES.

Specification forming part of Letters Patent No. 14,800, dated May 6, 1856; Reissue No. 2,339, dated August 21, 1866.

*To all whom it may concern:*

Be it known that JOHN D. BROWNE, of Cincinnati, Ohio, did obtain Letters Patent for Improvements in Machines for Paring Apples, bearing date May 6, 1856, of which I, JAMES F. MONROE, of Fitchburg, in the county of Worcester and State of Massachusetts, am sole assignee; and I do hereby declare that the following is a full and exact description of said invention, reference being had to the accompanying drawings, making part of this specification.

Figure 1 is an elevation of the machine; Fig. 2, an elevation looking at right angles to Fig. 1, a portion of the machine being in section in the plane of line *x x*, Fig. 3; Fig. 3, a horizontal section in the plane of line *y y*, Fig. 2.

Like letters of reference indicate corresponding parts in all the figures.

The invention has special reference to the construction of the main frame on which the operating parts are mounted, and by which the machine is clamped or fastened to a table or bench; also, in the arrangement of the operating parts.

As represented in the drawings, the frame consists, essentially, of a standard, A, provided with suitable bearings for the driving-wheel, fork, and operating-scroll, or equivalent gear; a base, C, for resting on the top of a shelf, bench, or table, provided with a suitable clamp extending therefrom, having a thumb-screw, B, for screwing up and holding against the shelf or table; and an arm or bearing, D, for supporting the knife-frame.

In the bearing *a* of the standard A rests the shaft *d* of the fork *e*, in the bearing *b* rests the shaft *k* of the driving-wheel E, and in the bearing *c* rests the shaft *g* of an operating-scroll or spiral ledge, *i*, that drives the knife-frame presently to be described. On the outer ends of shafts *d g* are situated pinions, *f j*, that mesh with a cog-gear on the inner periphery of wheel E.

On the arm or bearing D is hung the knife-frame G, working easily thereon, and around said arm or bearing a spiral spring, H, is placed, one end of which is attached to the arm and the opposite to the knife-frame. On the extremity of the arm D is an eccentric arm or bearing, I, to which is secured a toothed wheel, J, in which the scroll or ledge *i* gears.

To the under side of wheel J, on opposite sides and near the edge, there are attached two projections, *l l*, which extend below the upper edge of the frame G, in a certain part of which a slot, *m*, is made, the use of which will be presently shown.

At a suitable position a coiled-wire spring, *o*, is secured to the frame G, the opposite end extending up and having secured to it a stock, K, in which is fitted a knife, *n*. In their normal position the stock and knife are in a line with the fork.

As the driving-wheel E is turned it gives motion to the fork *e*, on which the apple is placed, and also to the scroll or ledge *i*, that gears with the wheel J. As this rotates one of the projections *l* will bear against the upper edge of the frame G, which will consequently be turned, as also the knife *n*. As soon as the knife has passed a half-circle and finished paring the apple the projection *l* will reach the slot *n* in the frame and will pass through it, and the frame and knife will be released from the impelling-wheel J and be thrown back to their original position by the spiral spring H.

The peculiar construction and arrangement of the main frame allows the mounting of all the mechanism in the simplest form, and may be cast in a single piece.

The standard A, which is of considerable height, forms the bearing of the driving parts, while the arm or bearing D serves as the bearing of the knife-frame. In addition to this, the base C, in connection with the clamp and the thumb-screw B, serves to attach the frame at any time to a shelf or table to hold it steadily in place. Thus a special base or block to secure the machine to is not required, and not only is expense obviated, but the device with this attachment is really much more effective.

Owing to the considerable height of the standard A much strain and vibration come upon the frame, especially in rapid work. This strain is not only exerted laterally, but vertically, and a machine of such small size cannot be easily held in place or retained by being simply held by its own base, unless that were made so heavy as to be very cumbersome, owing to the difficulty of keeping it steady and firm while it is turned.

By the described improvement the working parts of the machine may, when required, be instantly and securely attached to any piece of furniture or fixture that will afford adequate support, and when not in use is more easily disposed of, as it is lighter, more compact, and portable, and may be hung upon a hook or laid on a shelf for safe keeping.

Clamps for attaching to a shelf have before been used in connection with other machines, but to such simply I lay no claim. I consider the novel feature in this connection to consist in the special construction of the main frame made up of the standard, the arm, the base, the clamp, and the thumb-screw, the said parts forming a whole, adapted not only to secure the machine to a shelf or table, but also to receive the working mechanism of an apple-parer. Such a device, I believe, was never known before Mr. BROWNE'S invention.

The mechanism, aside from the frame, is of a very simple and effective character, and not liable to disarrangement.

I do not claim, simply and broadly, a clamp and screw attaching to a table or shelf, as I am aware that the same has been long known; but

What I claim, and desire to secure by Letters Patent, is—

The combination, with the apple-revolving mechanism, the knife moving and controlling mechanism, and the frame, of a clamp, B C, for temporarily attaching the apple-paring machine to a table or support, substantially as and for the purpose herein specified.

Witnesses: JAMES F. MONROE.
C. H. B. SNOW,
H. M. RAYMOND.